United States Patent [19]

Hiller et al.

[11] Patent Number: 5,251,996
[45] Date of Patent: Oct. 12, 1993

[54] ELEMENT FOR CONNECTING TWO PARTS

[76] Inventors: Mats Hiller, P1 4010; Leif Skogsberg, Box 3155, both of S-810 10 Torsåker, Sweden

[21] Appl. No.: 870,940

[22] Filed: Apr. 20, 1992

[30] Foreign Application Priority Data

Apr. 25, 1991 [SE] Sweden .................. 9101249

[51] Int. Cl.⁵ .............................. B25G 3/26
[52] U.S. Cl. .................. 403/406.1; 403/292; 403/298; 403/331; 411/456; 411/455; 411/409; 411/922; 52/586
[58] Field of Search .......... 403/405.1–407.1, 403/298, 292, 331, 353, 354; 411/455, 456, 451, 452, 409, 446, 402, 922, 923; 52/578, 585, 586, 589

[56] References Cited

U.S. PATENT DOCUMENTS

| | | | |
|---|---|---|---|
| 337,765 | 3/1886 | Guss | 411/923 X |
| 653,326 | 7/1900 | Tyden | 52/585 |
| 1,298,015 | 3/1919 | Curtis | 411/923 X |
| 2,328,823 | 9/1943 | Mackewzie | 52/585 X |
| 3,214,802 | 11/1965 | Davis | 403/298 X |
| 3,235,920 | 2/1966 | Davis | 52/586 |
| 3,276,797 | 10/1966 | Humes, Jr. | 52/586 X |
| 3,883,258 | 5/1975 | Hewson | 403/292 X |
| 3,950,915 | 4/1976 | Cole | 52/586 |
| 4,728,237 | 3/1988 | Lorincz et al. | 411/922 X |

FOREIGN PATENT DOCUMENTS

| | | | |
|---|---|---|---|
| 259171 | 1/1968 | Austria | 403/292 |
| 391001 | 8/1990 | Austria . | |
| 117205 | 8/1984 | European Pat. Off. | 52/586 |
| 0220337 | 5/1987 | European Pat. Off. . | |
| 2701871 | 1/1977 | Fed. Rep. of Germany . | |
| 1550872 | 12/1968 | France | 52/586 |
| 14795 | 3/1902 | Sweden . | |
| 350293 | 10/1972 | Sweden . | |
| 224605 | 3/1943 | Switzerland . | |
| 452145 | 5/1968 | Switzerland . | |

Primary Examiner—Randolph A. Reese
Assistant Examiner—Harry C. Kim
Attorney, Agent, or Firm—Notaro & Michalos

[57] ABSTRACT

A connecting element for connecting two parts (1, 2) generally in a connection plane has a first portion (4) for connecting the element (3) relative to a first (1) of the parts and second portion (5) for connecting the element relative to the second part (2). The second portion (5) includes actuation members (6) which on relative movement of the parts (1, 2) substantially along the connection plane urge the parts forcefully towards each other.

3 Claims, 4 Drawing Sheets

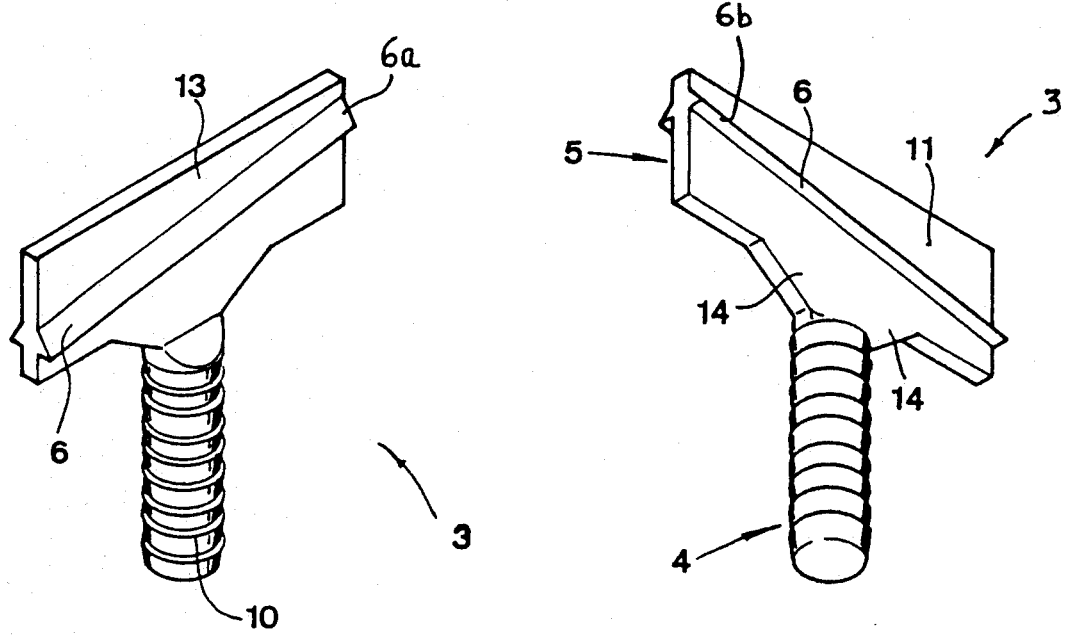

5,251,996

ELEMENT FOR CONNECTING TWO PARTS

FIELD OF INVENTION AND PRIOR ART

This invention is related to an element for connecting two parts adjoining to each other in a connection plane. Although the parts may consist of any suitable material, wood and plastics may be mentioned as examples. The parts may for instance have the character of fillets, battens, frame pieces etc.

Within the joiner's trade, and here the furniture making field as well as the building trade joinery may be involved in addition to other wood working fields, there is often a need for interconnecting parts which may have considerable dimensions substantially perpendicularly to the connection plane. These dimensions make it very difficult to connect the parts efficiently by means of conventional connection techniques, such as nailing, screwing etc. As an example of this type of connection task levelling of window and door frames may be mentioned. Need of such levelling, that is building-up of the frames by means of further board or fillet like parts, arises since building walls have varying thickness whereas on the other hand the frame dimensions as viewed perpendicularly to the plane of the wall occur in certain predetermined intervals. The connection techniques used today are not capable of causing an effective and lasting pressing of the parts towards and against each other in the connection region. This has the consequence that the parts soon, or even from the beginning, are separated by a gap, which is aesthetically inferior and, besides, may involve concrete technical problems.

SUMMARY OF THE INVENTION

The object of the present invention is to devise an element, which should be capable of connecting two parts adjoining to each other in a connection plane in such a manner that an efficient pressing of the parts towards or against each other occurs.

This object is fulfilled according to the invention by providing the connection element with the features more closely disclosed in the following.

Since, according to the invention, second means comprise actuation members, on relative movement of the parts along the connection plane, actuate the parts towards each other one obtains, on one hand, a very simple connection technique and, on the other hand, an efficient and lasting pressing of the parts towards and against each other.

It is suitable, that the actuation members comprise one or more inclined ridges or flanges. These inclined ridges or flanges will operate with a wedging effect so that the pressing of the parts towards or against each other is obtained.

It is preferred that the second means is arranged to protrude into a groove in the second part. It is then suitable that actuation members are arranged to grippingly cooperate with the walls of the groove in the second part.

If the ridges or flanges have a fluke like design it is obtained that they, on movement of the parts towards each other, present a relatively small resistance on pressing of the ridges or flanges into the second part, but, on the contrary, present a relatively great resistance to withdrawal in the opposite direction. This design has the important advantage that the parts in any intended relative position may be moved towards each other in a direction substantially transverse to the connection plane so as to obtain the initially intended engagement, whereafter forceful pressing of the parts against each other can be achieved by relative movement of the parts substantially parallel to the connection plane.

Further advantages and favorable features of the invention appear in the following description.

BRIEF DESCRIPTION OF THE DRAWINGS

With reference to the enclosed drawings a more specific description of examples of the invention follows hereinafter In the drawings:

FIG. 1 is a perspective view of the connecting element according to the invention viewed obliquely from above;

FIG. 2 is a perspective view of the element obliquely from below;

DETAILED DESCRIPTION OF PREFERRED EMBODIMENTS

Figure 3:
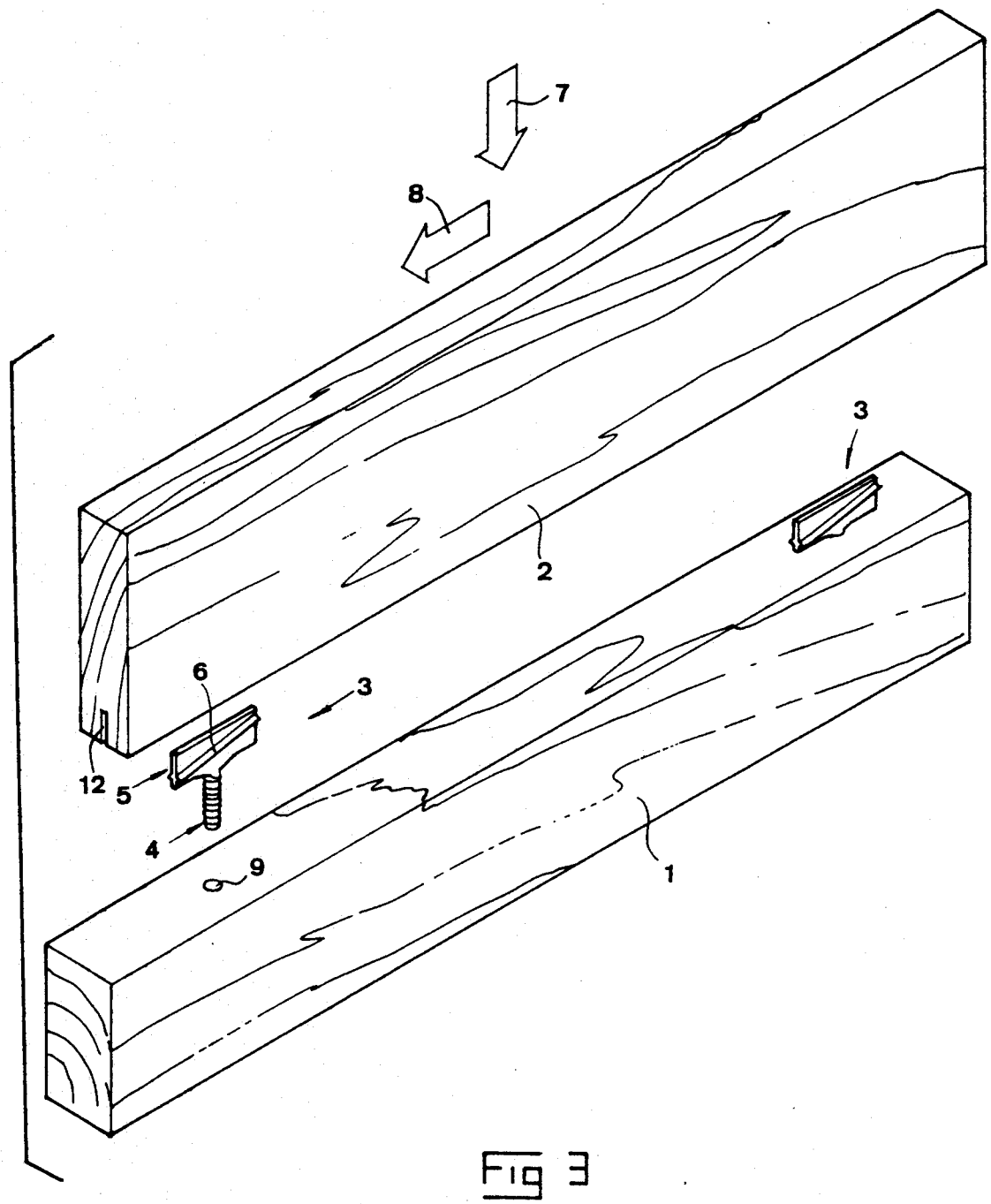
FIG. 3 is a perspective view illustrating two parts during connection to each other.
Figures 4, 5:
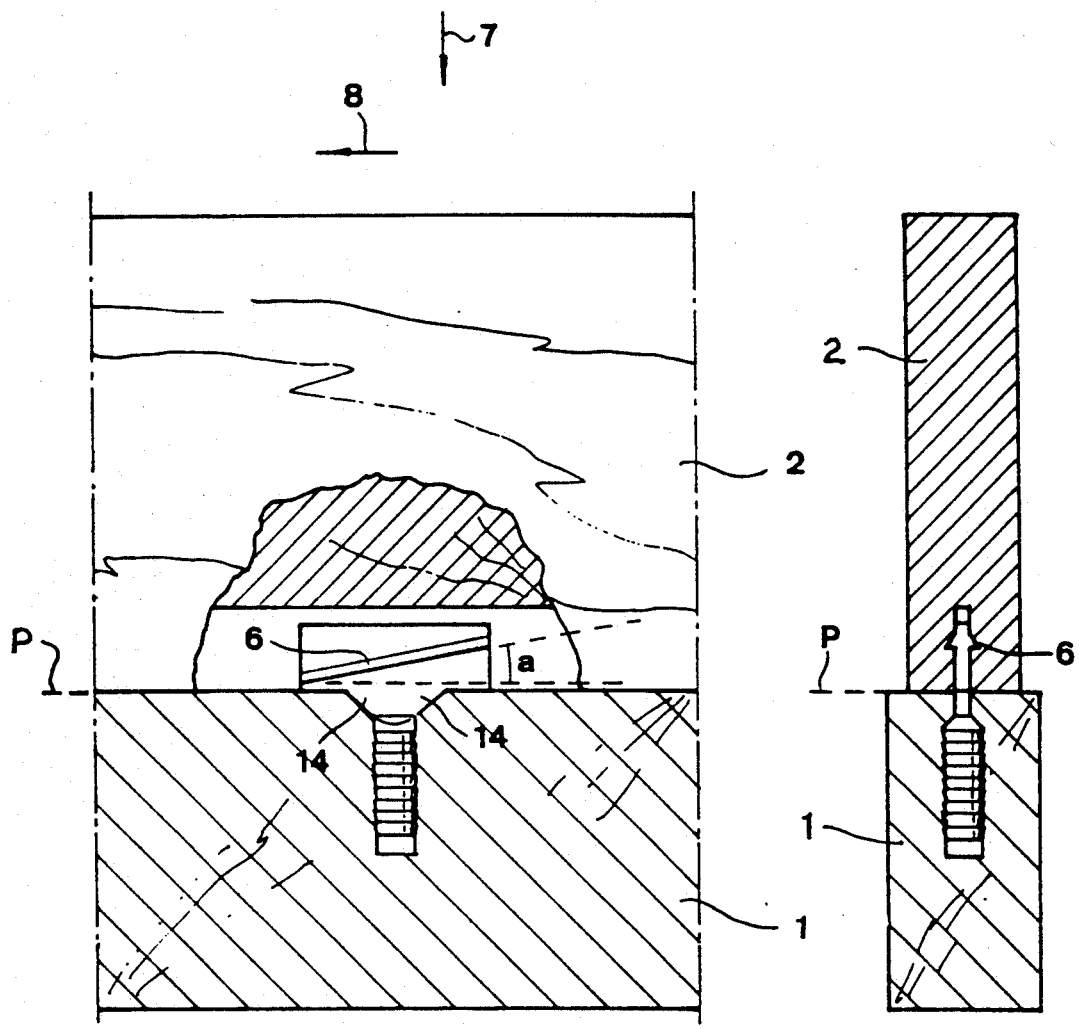
FIG. 4 is a partially cut view illustrating the parts connected to each other by means of a connecting element.
FIG. 5 is a partially cut view illustrating the parts and the connecting element according to FIG. 4 viewed from the right in the last mentioned figure.

A first embodiment of the element according to the invention for connecting two parts 1, 2 in a connecting plane P (FIGS. 4 and 5) is illustrated in FIGS. 1–5. The term "connection plane" should be interpreted in a wide sense. Within the frame work of this term, obviously equivalent designs such that the two parts 1 and 2 in the connection region have curved surfaces adjoining to each other or surfaces which are stepwise complementary or otherwise adjoin to each other in such a manner that the surfaces of the parts 1 and 2 adjoining to each other do not lie in a single plane as in the case illustrated as an example in the drawings and described herein are of course included.

The connecting element 3 according to the invention comprises first means 4 for connecting the element relative to a first 1 of the parts and second means 5 for connecting the element relative to the second part 2.

Said second means 5 comprise actuation members 6, which on relative movement of the parts 1 and 2 along the connection plane P (that is the direction of the arrows 8) actuate the parts 1, 2 towards each other in such a manner that the parts are effectively forced against each other with such a pressure that no interspaces occur between the parts provided that their surfaces adjoining to each other are relatively planar or otherwise complementary to a relatively satisfactory degree.

The first means 4 should have such an ability to connection of the element relative to the first part 1 that this connection is sufficiently rigid to avoid loosening of the element from the first part under influence of the forces occurring when the parts 1, 2 are moved relative to each other along the connection plane P in order to make the actuation members 6 exert their operation to tighten the parts against each other.

In this embodiment the first means 4 has the character of a pin designed for reception in holes 9 provided in the first part 1 by for instance boring. The pin 4 may comprise fluke like circumferential cams 10, which are so designed that they, with a relatively small resistance, allow the pin 4 to be pressed into a hole 9 having a diameter relatively snugly fitting to the diameter of the pin 4. The fluke like cams 10 are, however, arranged to cooperate in such a manner with the wall of the hole 9 that a relatively great resistance to withdrawal out of the hole occurs in accordance with the fluke principle.

In another embodiment the first means 4 may have the character of a screw (FIG. 3), so that, accordingly, the connecting element is driveable into the first part by rotation.

The second means 5 comprise a disk or plate 11, which is connected with the pin 4 and suitably designed in one piece therewith.

The actuation members 6 comprise one or more inclined ridges or flanges 6. In the example according to FIGS. 1-5 a respective ridge or flange 6 is arranged on both flat sides of the plate 11. The ridges or flanges 6 have a fluke like design and project sidewardly from the plate 11 and are suitably designed in one piece therewith.

With the expression that the ridges or flanges 6 are "fluke like" it is intended that they are chamfered or otherwise designed so that they present a relatively small resistance on pressing the ridges or flanges 6 into the part 2 but, on the contrary, present a relatively great resistance to withdrawal in the opposite direction. This embodiment involves the important advantage that the connecting element allows movement of the parts 1 and 2 towards each other in an arbitrary direction, for instance substantially transversely to the connection plane P. It is then particularly notable that the direction of movement of the parts towards each other may be in any other directions than exactly parallel to the inclined ridges or flanges 6. The flukelike design means, for example, ridges with triangular cross-section, that are solid and that have an upper, mildly inclined side 6a in FIG. 1, and a lower, greatly inclined side 6b in FIG. 2.

The second means 5, that is in practise the plate 11 and the ridges or flanges 6, are adapted to be able to penetrate into a groove 12 provided in the second part 2. The actuation members or flanges 6 are adapted to grippingly cooperate with the walls of the groove 12 in the part 2.

It is preferred that the ridges or flanges 6 have a rectilinear extent and, more specifically, are so disposed in the connection position of the connecting element that they form an angle to the connection plane P. This angle a is suitably not larger than 30 degrees, preferably between 1 and 20 degrees. An angle a between 5 and 15 degrees has been found particularly suitable.

It is preferred that the plate 11 of the connecting element comprises a forward guiding plate portion 13, which on introduction of the first means 5 of the connecting element into the groove 12 in the part 2 reaches into the groove and exerts a guiding operation before the ridges or flanges 6 arrive into the groove.

The connecting element comprises members 14, which on connecting of the element to the first part 1 cooperate therewith to counteract rotation of the connecting element relative to this part. In the embodiment these members 14 are formed by wing like portions (see also FIG. 4) which on connection of the element 3 to part 1 penetrate into the material thereof and in this way operate so as to prevent rotation. As appears from the figures, the wing like portions 14 are formed by parts of the plate 11 in the transition region between the plate and the pin 4.

The connecting element described is used in the following way: of the two parts 1 and 2 to be connected, one 1 is provided with bores 9 in correspondence to the number of connecting elements to be used. Thereafter the connecting elements 3 are located with their pins 4 in the holes 9 and the connecting elements are hammered into the holes so that their portions 14 preventing rotation cut into the material of the part 1. The connecting elements should of course then be adequately rotated in relation to the part 1. Furthermore, it is evident that the various connecting elements 3 to be used are located so that their ridges or flanges 6 are inclined in the same direction. The other part 2 is provided with a longutudinal groove 12 adapted to receive the plate like member 11 of the connecting elements. It is suitable that the groove 12 has a width which is approximately equal to or possibly somewhat smaller than the thickness of the plate 11 so that the latter with some resistance enters into the groove. Such grooves 12 may easily be provided by means of appliances, namely working tables and circular saw blades, normally occurring on building sites.

When the connecting elements 3 have been located in the part 1, the part 2 is located with its groove over the guide portions 13 of the connecting elements and then the part 2 is beaten or hammered in the direction towards part 1 (that is in the direction of arrow 7) so that the plates 11 and ridges 6 of the connecting elements enter into the groove 12 and the ridges 6 grip into the walls of the groove. When the parts 1 and 2 have reached against each other, such forces are instead applied on the second part 2 by impacts or beats, that the second part moves along the arrow 8 relative to the first part 1; the inclined ridges or flanges 6 of the connecting elements 3 will then force the part 2 to be pressed against the part 1 by cooperation with the walls of the groove.

From that stated appears that the connecting operation as a rule will involve a movement of the parts 1 and 2 towards each other and then a relative movement (arrow 8) between the parts at an angle to the movement (arrow 7) of the parts towards each other. The movement of the parts towards each other is normally intended to be directed substantially transversely to the connection plane P.

Figure 6:
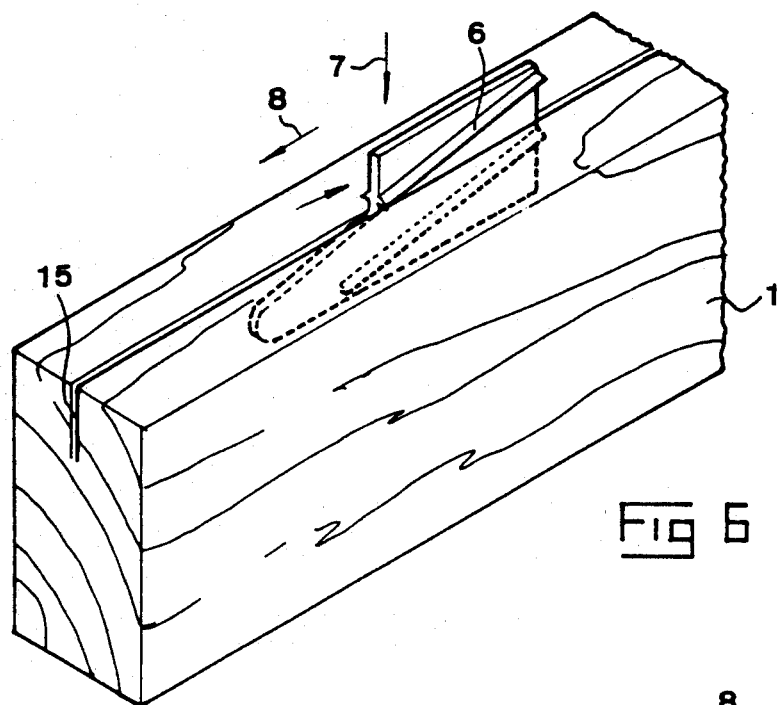
FIG. 6 is a perspective view illustrating an alternative embodiment of the connecting element secured to a first part.
Figure 7:
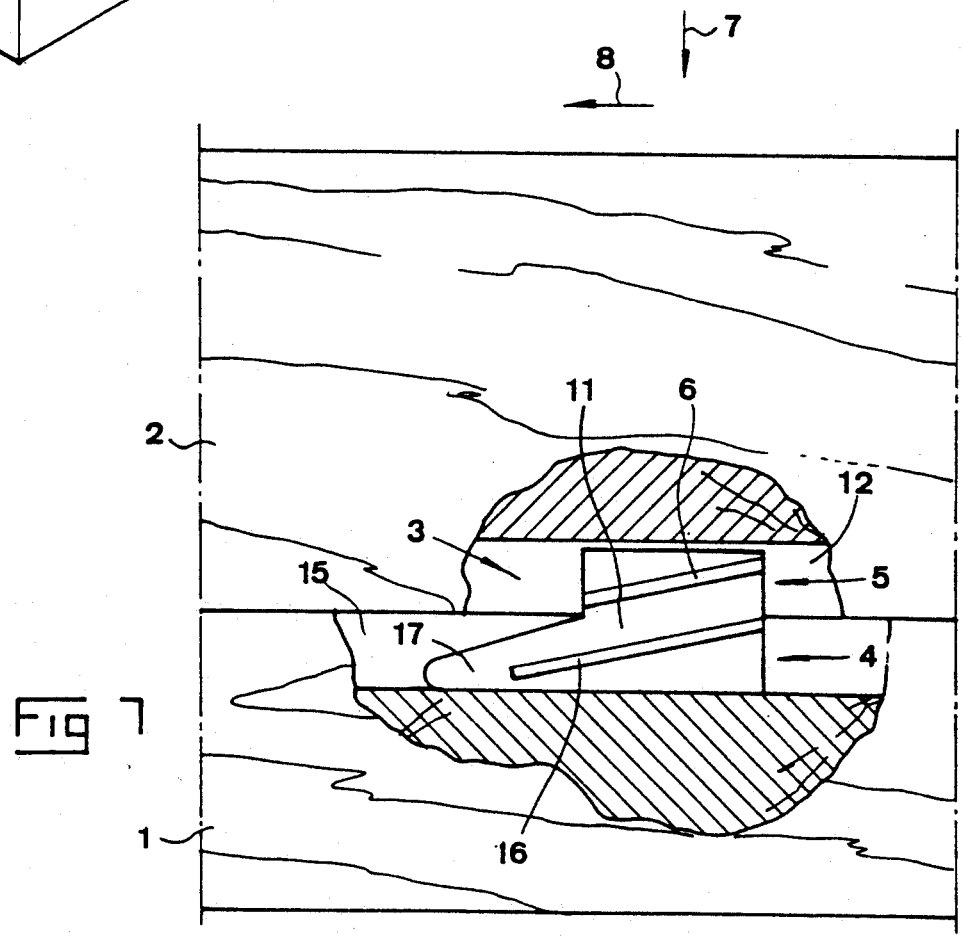
FIG. 7 is a view similar to FIG. 4 but illustrating the connecting element according to FIG. 6 as connecting two parts.

The variant according to FIGS. 6 and 7 differs from the embodiment according to FIGS. 1-5 since no pin element is at hand in this case. Instead, the first means 4 of the connecting element 3 is designed so as to project into the first part 1, and more specifically a groove 15 arranged therein, and also this means 4 comprise here actuation members 16, which on movement of the connecting element 3 along the first part 1 actuate the element into pressing against that part.

As appears from FIGS. 6 and 7 the first means 4 and the second means 5 comprise parts of one and the same plate 11, which comprises first actuation members 6 for engaging with the second part 2 and second actuation members 16 for engaging with the first part 1. Both of these actuation members are formed by inclined ridges or flanges, which are inclined in the same direction. In practice, the ridges or flanges are substantially parallel.

As previously, the second means 5 is intended to protrude into a groove 12 arranged in the second part.

The plate part 11 of the first means 4 intended to project into the groove 15 in the first part 1 has suitably a larger length than the plate part 11 of the second means 5 arranged to protrude into the groove 12 of the second part 2 so that, accordingly, the first means 4 obtains a projecting portion 17, which has the purpose to act stabilizing and avoid overturning of the connecting element in the groove in the first part 1. For this purpose it is preferred that the projecting portion 17 is arranged so that it is capable of counteracting, by contacting the bottom of the groove, the connecting element to be turned over due to the forces occurring on the connection operation.

In the embodiment according to FIGS. 6 and 7 grooves 15 and 12 respectively are arranged in both parts 1 and 2. The connecting element 3 is first located in the groove 15 in the first part 1 and hammered or beaten in place in the direction of arrow 8 (FIG. 7) so that the connecting element is pressed against the bottom of the groove 15. It is evident that the ridges or flanges 16 engaging with the part 1 should have such a fluke like design that they may counteract withdrawal of the connecting element out of the groove of the part in an efficient manner, that is these ridges or flanges 16 should be capable of operating retaining in relation to the part 1 in an opposite direction to the retaining action exerted by the ridges or flanges 6 intended to engage with the second part 2.

The part 2 is then located over the connecting element 3 and the part 2 is hammered or beaten downwardly until the means 5 has entered into the groove 12 of the part 2. The movement of the parts towards each other occurs in the direction of the arrow 7. The part 2 is then hammered or beaten substantially parallel to the connection plane in the direction of the arrow 8 which causes the ridges or flanges 6 to urge the part 2 into pressing against the part 1 by cooperation with the walls of the groove 12.

The connecting element described has turned out to give, in tests, excellent connection results with tight joints and lasting intimate pressing of the parts against each other.

The invention is of course not only restricted to the embodiments described and illustrated. Thus, a plurality of modifications are possible. It has, for instance, above been described that it as a rule is suitable to arrange grooves 12 and 15 respectively in the parts for receiving the different portions of the connecting elements. However, it is stressed that it is not absolutely necessary to arrange such grooves in advance. If the connecting element along edges of its plate portions is provided with sharp lips which in the necessary degree may cut into the wood or plastics material or similar in question, the formation of grooves may possibly be avoided entirely. It is evident that the connecting elements according to the invention could be provided with more ridges or flanges 6 and 16 respectively than illustrated in the drawings. Also other modifications are possible within the scope of the invention.

We claim:

1. A connecting element for connecting two parts (1, 2) at a general connection plane (P), said element comprising: first means (4) for connecting the element (3) relative to a first of the parts (1) and second means (5) for connecting the element (3) relative to a second of the parts (2), said second means (5) comprising actuation members (6) which on relative movement of the parts along the connection plane (P) move the parts toward each other, said actuation members (6) comprising ridges which are inclined relative to the connection plane (P), said ridges having a fluke-like design so as to present, on movement of the parts (1, 2) in a first direction toward each other, a relatively small resistance to pressing of the ridges into the second part (2) but, on the contrary, present a relatively great resistance to withdrawal of the ridges from the second part (2) in a second opposite direction, said first means (4) being shaped to connect the element (3) relative to the first part (1) sufficiently rigidly to avoid loosening of the element from the first part (1) under influence of forces occurring when the parts (1, 2) are moved relative to each other along the connection plane (P) in order to make the actuation members (6) operate to tighten the parts (1, 2) against each other, said second means (5) comprising a plate portion (11), the actuation members comprising at least two of said ridges arranged and aligned with each other on the plate portion (11), on opposite flat sides of the plate portion, the second means (5) being shape to penetrate into a groove (12) in the second part (2), the actuation members (6) being adapted to grippingly cooperate with walls of the groove (12) in the second part (2), and the first means (4) comprising a pin adapted for reception in a hole (9) in the first part (1).

2. A connecting element according to claim 1, wherein the pin is provided with fluke-like cams (10).

3. A connecting element according to claim 1, wherein the pin comprises a screw.

* * * * *